United States Patent
Tsuboi

(10) Patent No.: US 9,618,020 B2
(45) Date of Patent: Apr. 11, 2017

(54) POWER GENERATION APPARATUS AND POWER GENERATION SYSTEM

(71) Applicant: Kobe Steel, Ltd., Kobe-shi (JP)

(72) Inventor: Noboru Tsuboi, Kako-gun (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 14/154,344

(22) Filed: Jan. 14, 2014

(65) Prior Publication Data

US 2014/0284931 A1 Sep. 25, 2014

(30) Foreign Application Priority Data

Mar. 25, 2013 (JP) .................. 2013-062146

(51) Int. Cl.
| | | |
|---|---|---|
| *F15B 15/20* | (2006.01) | |
| *H02K 99/00* | (2014.01) | |
| *F01C 1/16* | (2006.01) | |
| *F01C 13/00* | (2006.01) | |

(52) U.S. Cl.
CPC ............. *F15B 15/20* (2013.01); *F01C 1/16* (2013.01); *F01C 13/00* (2013.01); *H02K 99/10* (2016.11)

(58) Field of Classification Search
CPC ....... F15B 15/18; F15B 15/20; H02K 57/003; F01C 1/16; F04C 29/045
USPC ............ 290/52, 54; 418/201.1, 83, 86; 60/643–681; 310/52, 54
See application file for complete search history.

(56) References Cited

U.S. PATENT DOCUMENTS

| | | | | |
|---|---|---|---|---|
| 4,864,174 A | * | 9/1989 | Kawamura et al. | ... 310/216.055 |
| 5,211,026 A | * | 5/1993 | Linnert | ............... 62/175 |
| 5,559,379 A | * | 9/1996 | Voss | ................ 310/63 |
| 5,659,205 A | * | 8/1997 | Weisser | ............. 290/52 |
| 6,045,344 A | * | 4/2000 | Tsuboi et al. | ............ 418/100 |

(Continued)

FOREIGN PATENT DOCUMENTS

| | | | | |
|---|---|---|---|---|
| BE | EP 0009843 A1 | * | 4/1980 | ............ F01D 15/10 |
| CN | 101581304 A | | 11/2009 | |

(Continued)

OTHER PUBLICATIONS

EP 0009843 A1 Englsih Translation.*

*Primary Examiner* — Thomas Denion
*Assistant Examiner* — Jessica Kebea
(74) *Attorney, Agent, or Firm* — Oblon, McClelland, Maier & Neustadt, L.L.P.

(57) ABSTRACT

A power generation apparatus according to the present invention includes: an expander; a generator that includes a generator rotor driven by the expander and a stator disposed outside the generator rotor in the radial direction; and a casing that includes an expander chamber accommodating the expander and a generator chamber accommodating the generator. The casing includes a first communication portion that causes an expansion chamber which gradually expands a working medium by the expander in the expander chamber to communicate with a front generator portion which is located nearer the expansion chamber than the generator in the generator chamber and a second communication portion that causes a portion which is a downstream portion from the expansion chamber and is located near the expansion chamber with respect to the generator to communicate with the front generator portion.

6 Claims, 4 Drawing Sheets

(56) References Cited

U.S. PATENT DOCUMENTS

| | | | |
|---|---|---|---|
| 7,341,438 B2* | 3/2008 | Uno | F01C 1/0246 |
| | | | 418/183 |
| 7,638,892 B2* | 12/2009 | Myers | 290/52 |
| 7,841,306 B2* | 11/2010 | Myers et al. | 122/406.5 |
| 8,400,005 B2* | 3/2013 | Huber et al. | 290/52 |
| 8,790,100 B2* | 7/2014 | Tsuboi et al. | 418/201.2 |
| 8,820,082 B2* | 9/2014 | Yoshimura | 60/671 |
| 2006/0186671 A1* | 8/2006 | Honda et al. | 290/54 |
| 2008/0122226 A1* | 5/2008 | Madison | 290/52 |
| 2009/0277215 A1 | 11/2009 | Tsuboi | |
| 2010/0090476 A1* | 4/2010 | Wada | 290/1 A |
| 2012/0153620 A1* | 6/2012 | Artinian et al. | 290/52 |
| 2012/0304643 A1* | 12/2012 | Mori | F01K 23/065 |
| | | | 60/618 |
| 2012/0321497 A1* | 12/2012 | Takayama | F01C 1/0223 |
| | | | 418/55.1 |
| 2013/0008159 A1* | 1/2013 | Tang | 60/517 |
| 2013/0119671 A1* | 5/2013 | Tang | 290/54 |
| 2013/0134720 A1* | 5/2013 | Fukasaku et al. | 290/40 R |
| 2013/0207396 A1* | 8/2013 | Tsuboi | 290/52 |
| 2014/0159369 A1* | 6/2014 | Tsuboi et al. | 290/52 |
| 2015/0318763 A1* | 11/2015 | Kubota | F01K 27/02 |
| | | | 290/52 |

FOREIGN PATENT DOCUMENTS

| | | |
|---|---|---|
| CN | 102733873 A | 10/2012 |
| JP | 10-290543 A | 10/1998 |
| JP | 2004-353571 A | 12/2004 |
| JP | 2012-127201 A | 7/2012 |
| JP | 2012-147567 A | 8/2012 |
| WO | WO 2012020630 A1 * | 2/2012 |

* cited by examiner

POWER GENERATION APPARATUS AND POWER GENERATION SYSTEM

BACKGROUND OF THE INVENTION

Field of the Invention

The present invention relates to a power generation apparatus and a power generation system.

Description of the Related Art

Hitherto, there is known a power generation apparatus that drives an expander by a working medium and generates power by a generator directly coupled to the expander. A power generation apparatus disclosed in JP 2004-353571 A is equipped with a cooling pipe that leads a working medium condensed by a condenser to a cooler of a generator. Accordingly, the generator may be effectively cooled. However, a problem arises in that the cooling pipe that leads the working medium to the cooler of the generator is needed. On the contrary, a power generation apparatus disclosed in JP 2012-147567 A may cool a generator without providing a cooling pipe. That is, in the power generation apparatus, the expander and the generator are accommodated inside a casing, and the casing is provided with a partition wall portion that divides the casing into a first space accommodating the expander and a second space accommodating the generator. Then, the partition wall portion is provided with a communication portion that causes the first space to communicate with the second space. The communication portion extends from a discharge port, from which the working medium expanded by the expander is discharged, toward the second space. Accordingly, the working medium that is expanded by the expander inside the first space is introduced into the second space through the communication portion. Although the second space accommodates the generator, a working medium discharge portion is provided at the opposite side to the communication portion with the generator interposed therebetween. For this reason, the working medium that is introduced into the second space through the communication portion passes through the inside of the generator (for example, a gap between a stator and a rotor), and is discharged from the discharge portion to the outside of the casing.

In the power generation apparatus disclosed in JP 2012-147567 A, the generator may be cooled without providing the cooling pipe, but the following problems remain. That is, in the power generation apparatus, since the working medium is caused to pass through the inside of the generator (for example, the gap between the stator and the rotor), the working medium circulation resistance increases, and hence a problem arises in that the power generation efficiency is degraded. Further, if the working medium contains foreign matter, a problem also arises in that the foreign matter intrudes into the gap between the rotor and the stator of the generator.

SUMMARY OF THE INVENTION

Therefore, the present invention is made in view of the related art, and an object thereof is to provide a power generation apparatus capable of cooling a generator by a simple configuration while suppressing a working medium circulation resistance generated when cooling the generator.

In order to attain the above-described object, according to the present invention, there is provided a power generation apparatus including: an expander; a generator that includes a rotor driven by the expander and a stator disposed outside the rotor in the radial direction; and a casing that includes an expander chamber accommodating the expander and a generator chamber accommodating the generator, in which the casing includes a first communication portion that causes an expansion chamber which gradually expands a working medium by the expander in the expander chamber to communicate with a front generator portion which is located nearer the expansion chamber than the generator in the generator chamber, and a second communication portion that causes a portion which is a downstream portion from the expansion chamber in the working medium flow direction and is located near the expansion chamber with respect to the generator to communicate with the front generator portion.

In the present invention, the expansion chamber communicates with the generator chamber by the first communication portion. Meanwhile, the generator chamber communicates with the downstream portion from the expansion chamber by the second communication portion. Since the pressure of the downstream portion from the expansion chamber is lower than the pressure inside the expansion chamber during the expansion process, the working medium inside the expansion chamber flows to the generator chamber through the first communication portion due to a pressure difference therebetween, and then the working medium flows to the downstream portion from the expansion chamber through the second communication portion. For this reason, the generator may be cooled by the working medium inside the generator chamber. Accordingly, it is possible to simply cool the generator by the working medium without newly providing a cooling pipe. Further, since the second communication portion causes the portion which is located near the expansion chamber with respect to the generator and is located at the downstream side of the expansion chamber to communicate with the front generator portion, the working medium flows inside the generator chamber without flowing inside the generator (or slightly flowing inside the generator). For this reason, the working medium circulation resistance inside the generator chamber does not increase. Accordingly, the working medium may be effectively caused to flow by the pressure difference, and the power generation efficiency may be prevented from being degraded. Further, since the working medium does not flow inside the generator or slightly flows inside the generator, there is a low possibility that foreign matter intrudes into the generator even when the foreign matter is contained in the working medium.

Here, a coil of the stator may face a flow passage in which the working medium flows inside the front generator portion. In this aspect, since the coil of the stator faces the working medium flow passage, the coil that easily emits heat may be efficiently cooled.

The casing may include a step portion that is located at the rear side of the stator and protrudes inward in the radial direction. In this case, a stator core of the stator may include a radial contact portion that contacts an inner peripheral surface of the casing in the radial direction and an axial contact portion that contacts the step portion in the axial direction.

In this aspect, the heat of the stator core is directly transmitted to the casing, but the heat may be emitted through the casing.

Further, since the casing is provided with the step portion, the stator may be easily positioned in the axial direction. When the position of the step portion in the axial direction is adjusted, the width of the flow passage may be easily designed.

A downstream portion from the expansion chamber may be a discharge chamber of the expander. In this aspect, since the second communication portion is formed so as to cause the generator chamber to communicate with the discharge chamber, the complex configuration inside the casing may be suppressed, and hence an advantage in cost may be obtained.

According to the present invention, there is provided a power generation system including: an evaporator that evaporates a working medium; the above-described power generation apparatus; a condenser that condenses the working medium expanded by the expander of the power generation apparatus; and a pump that introduces the working medium condensed by the condenser into the evaporator. In the present invention, the power generation apparatus may generate power while circulating the working medium in the evaporator, the expander, and the condenser.

The power generation system may be an on-vehicle system. In this aspect, since the power generation system is used while being mounted on the vehicle, the power generation system may be used as a power supply source necessary for the vehicle.

As described above, according to the present invention, it is possible to suppress the working medium circulation resistance generated when the generator is cooled and to cool the generator by a simple configuration.

DESCRIPTION OF THE PREFERRED EMBODIMENTS

Hereinafter, an embodiment of the present invention will be described in detail with reference to the drawings.

Figure 1:
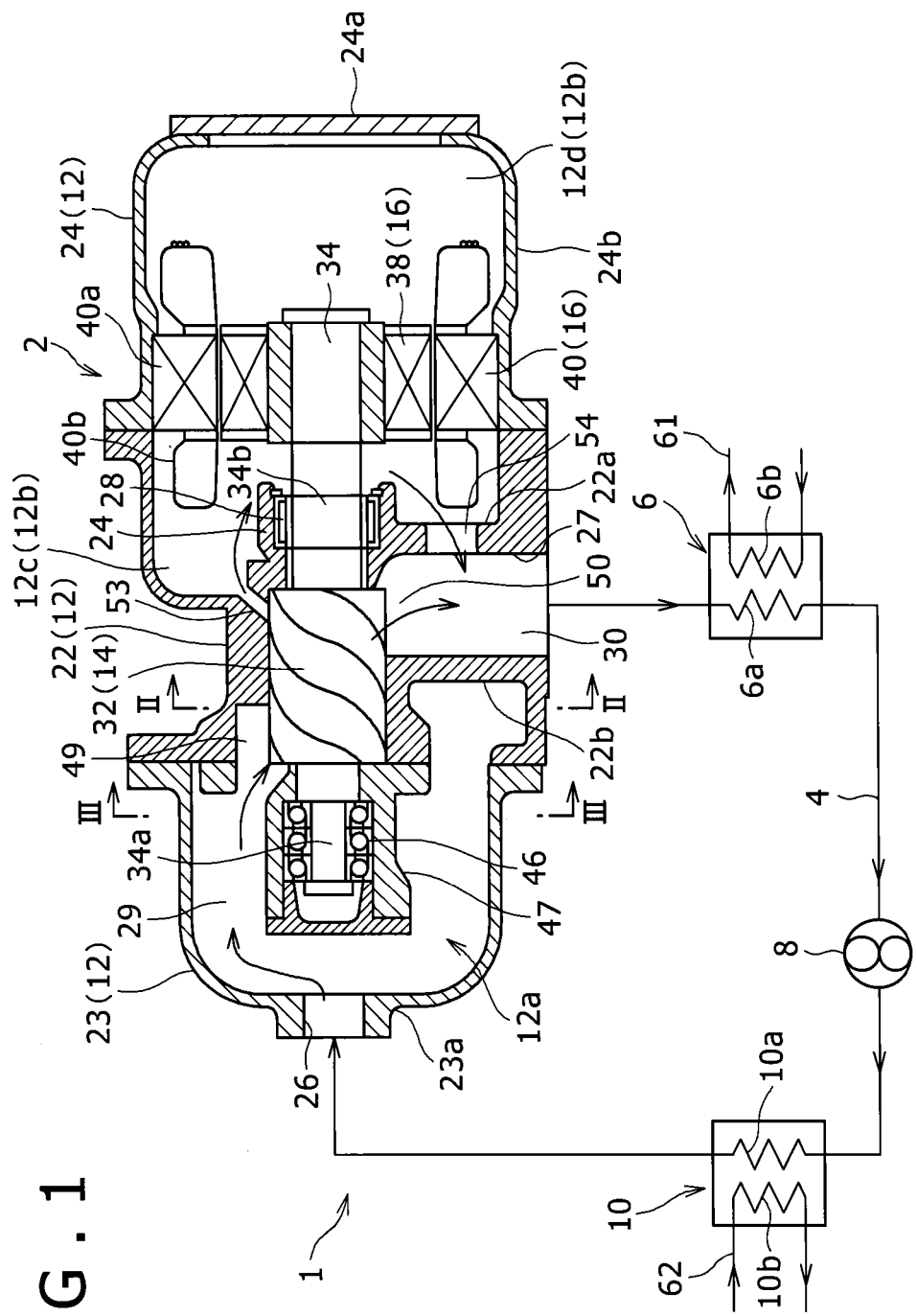
FIG. 1 is a diagram schematically illustrating the overall configuration of a power generation system according to an embodiment of the present invention.

As illustrated in FIG. 1, a power generation system 1 according to the embodiment is a power generation system that uses a Rankine cycle, and includes a power generation apparatus 2, a condenser 6, a circulation pump 8, and an evaporator 10. The power generation apparatus 2, the condenser 6, the circulation pump 8, and the evaporator 10 are provided in a circulation flow passage 4 in this order. A working medium circulates in the circulation flow passage 4. As the working medium, for example, a cooling medium such as R245fa (1, 1, 1, 3, 3-Pentafluoropropane) having a low boiling point is used. Accordingly, the power generation system is of a binary power generation type that recovers power from the low-temperature waste heat. Furthermore, the power generation system is configured as an on-vehicle system.

The power generation apparatus 2 includes a screw-type expander (hereinafter, simply referred to as an expander) 14, a generator 16, and a casing 12 that accommodates the expander 14 and the generator 16 while these components are connected to each other. The power generation apparatus 2 extracts a force for driving the generator 16 by expanding a gas-phase working medium in the expander 14. Furthermore, the power generation apparatus 2 will be described in detail later.

The condenser 6 condenses the gas-phase working medium discharged from the expander 14 so as to become a liquid-phase working medium. The condenser 6 includes a working medium flow passage 6a in which the gas-phase working medium flows and a cooling medium flow passage 6b in which the cooling medium flows by the connection with the flow passage 61 in which the cooling medium supplied from the outside flows. The working medium that flows in the working medium flow passage 6a exchanges heat with the cooling medium flowing in the cooling medium flow passage 6b so as to condense the cooling medium.

The circulation pump 8 is provided at the downstream side (between the evaporator 10 and the condenser 6) of the condenser 6 in the circulation flow passage 4 so as to circulate the working medium inside the circulation flow passage 4. The circulation pump 8 pressurizes the liquid-phase working medium condensed by the condenser 6 to a predetermined pressure and sends the pressurized working medium to the evaporator 10. As the circulation pump 8, a centrifugal pump that includes an impeller as a rotor or a gear pump that includes a pair of gears as a rotor is used.

The evaporator 10 is provided at the downstream side (between the circulation pump 8 and the power generation apparatus 2) of the circulation pump 8 in the circulation flow passage 4. The evaporator 10 includes a working medium flow passage 10a in which the working medium flows and a heating medium flow passage 10b in which the heating medium flows. The heating medium flow passage 10b is connected to a heating medium circuit 62, and the heating medium supplied from an external heat source flows in the heating medium flow passage 10b. The working medium that flows in the working medium flow passage 10a exchanges heat with the heating medium flowing in the heating medium flow passage 10b, and is then evaporated.

With the above-described configuration, in the power generation system according to the embodiment, a circulation circuit is configured in which the working medium flows through the circulation flow passage 4 in order of the evaporator 10, the power generation apparatus 2, the condenser 6, and the circulation pump 8.

Next, the configuration of the power generation apparatus 2 will be described in detail.

Figure 2:
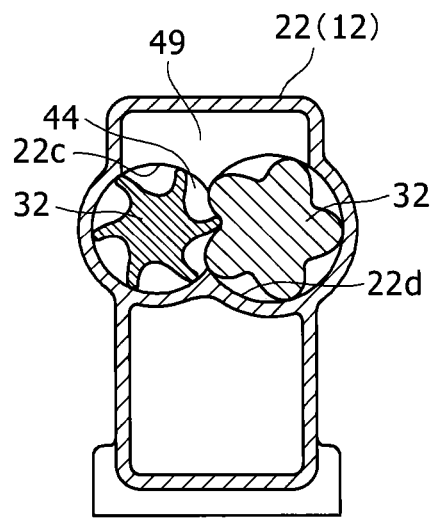
FIG. 2 is a cross-sectional view taken along the line II-II of FIG. 1.

The expander 14 of the power generation apparatus 2 includes a pair of expander rotors 32 respectively rotating about the axes. Each expander rotor 32 is configured as a screw rotor that includes teeth formed in a spiral shape along the outer peripheral surface thereof. As illustrated in FIG. 2, the teeth of both expander rotors 32 engage with one another, and the engagement position gradually moves in the axial direction with the rotation of the respective rotors 32.

As illustrated in FIG. 1, each expander rotor 32 includes a rotation shaft 34. Each rotation shaft 34 includes a first shaft portion 34a that extends from the expander rotor 32 toward one side in the axial direction and a second shaft portion 34b that extends from the expander rotor 32 toward the other side in the axial direction.

The generator 16 includes a generator rotor 38 that is connected to one expander rotor 32 through the second shaft portion 34b and a stator 40 that is disposed so as to surround the generator rotor 38. That is, the generator 16 is configured as an inner rotor type generator in which the generator rotor 38 is disposed inside the stator 40. The stator 40 includes a stator core 40a and a coil 40b that is attached to the stator core 40a. The generator rotor 38 includes an iron core and a coil. The generator rotor 38 rotates along with the expander rotor 32.

The casing 12 that accommodates the expander 14 and the generator 16 includes a cylindrical body portion 22 of which both ends are opened, a first lid portion 23 that is coupled to one end of the body portion 22 so as to block one end side opening of the body portion 22, and a second lid portion 24 that is coupled to the other end of the body portion 22 so as to block the other end side opening of the body portion 22. All of the body portion 22, the first lid portion 23, and the second lid portion 24 are made of metal. The first lid portion 23 is formed in a bottomed cylindrical shape, and a bottom portion 23a of the first lid portion 23 is provided with an introduction port 26 connected with the circulation flow passage 4. The second lid portion 24 is formed in a bottomed cylindrical shape, and the bottom portion of the second lid portion 24 is blocked differently from the first lid portion 23. The body portion 22 is provided with a discharge port 27 that is connected with the circulation flow passage 4.

A partition wall portion 22a is formed at the intermediate portion of the body portion 22 in the axial direction. An expander chamber 12a that accommodates the expander 14 and a generator chamber 12b that accommodates the generator 16 are formed inside the casing 12 by the partition wall portion 22a. The partition wall portion 22a is provided with a through-hole that penetrates the partition wall portion in the axial direction, and a bearing 28 that rotatably supports the second shaft portion 34b is fitted into the through-hole. Two bearings 28 are provided so as to correspond to the respective second shaft portions 34b while being located between the expander rotor 32 and the generator rotor 38.

The expander chamber 12a is divided into an inlet chamber 29 and a discharge chamber 30 by a partition portion 22b. The partition portion 22b is provided so as to be located at the opposite side to the generator 16 with respect to the partition wall portion 22a and to form a space between the partition wall portion 22a and the partition portion. The inlet chamber 29 is a space that is defined by the partition portion 22b and the first lid portion 23, and is a space in which the introduction port 26 is opened inside the expander chamber 12a. The discharge chamber 30 is a space that is defined by the partition portion 22b and the partition wall portion 22a, and is a space in which the discharge port 27 is opened inside the expander chamber 12a.

The partition portion 22b is provided with an opening portion, and the expander rotor 32 is disposed in the opening portion. The partition portion 22b includes an upper portion that is formed so as to protrude from the upper wall of the body portion 22 toward the inside (the lower side in FIG. 1) and a lower portion that extends from the bottom wall of the body portion 22 toward the inside (the upper side in FIG. 1). As illustrated in FIG. 2, a lower surface 22c of the upper portion is formed in a double-circular-arc shape corresponding to the outer shapes of the expander rotors 32, and the upper surface 22d of the lower portion is formed in a double-circular-arc shape corresponding to the outer shapes of the expander rotors 32. Then, the pair of expander rotors 32 is disposed inside an opening portion that is formed between the lower surface 22c of the upper portion and the upper surface 22d of the lower portion. A space that is formed among the expander rotor 32, the lower surface 22c of the upper portion, and the upper surface 22d of the lower portion becomes a space into which the working medium is introduced, and a space that is formed between the engaging teeth inside the space becomes an expansion chamber 44. The expansion chamber 44 moves in the axial direction with the rotation of the expander rotor 32 so that the volume thereof gradually increases. For this reason, the working medium is gradually expanded inside the expansion chamber 44.

Figure 3:
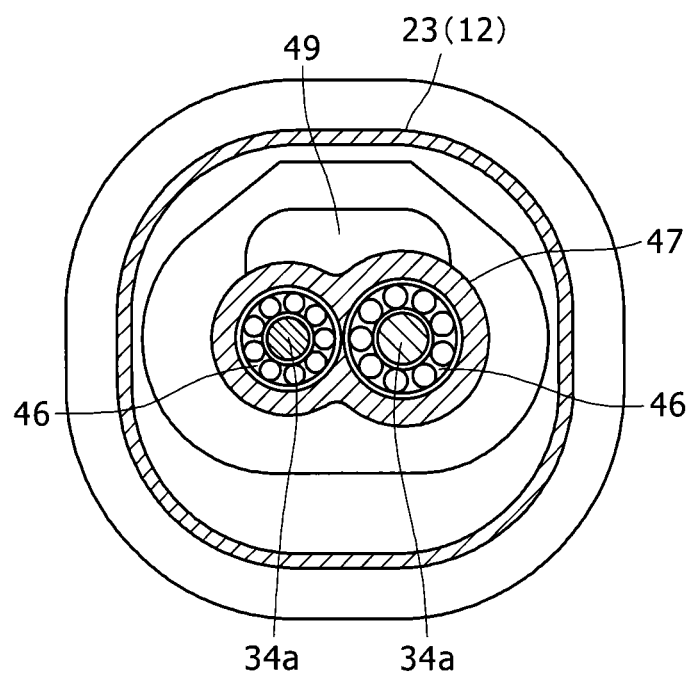
FIG. 3 is a cross-sectional view taken along the line of FIG. 1.

As illustrated in FIGS. 1 and 3, a bearing holding portion 47 that holds bearings 46 of the first shaft portions 34a is fixed to one end of the partition portion 22b in the axial direction. As illustrated in FIG. 3, the pair of bearings 46 is attached to the bearing holding portion 47, and the pair of first shaft portions 34a is rotatably supported by the bearings 46.

An inlet port 49 is formed in the upper portion of the partition portion 22b by notching one end in the axial direction (the end near the first lid portion 23). The inlet port 49 causes the inlet chamber 29 to communicate with the inside of the opening portion of the partition portion 22b, and the working medium inside the inlet chamber 29 is introduced into the opening portion through the inlet port 49 that is located at the upper side of one end of the expander rotor 32 (the end near the first lid portion 23).

The lower portion of the partition portion 22b supports one end of the expander rotor 32. For this reason, the expansion chamber 44 communicates with the discharge chamber 30 at the other end of the expander rotor 32 (the end near the second lid portion 24). An opening (outlet port 50) that causes the expansion chamber 44 and the discharge chamber 30 to communicate with each other is located at the lower side of the expander rotor 32, and the working medium that is expanded inside the expansion chamber 44 is discharged to the discharge chamber 30 through the outlet port 50.

The generator chamber 12b is a space that is defined by the partition wall portion 22a of the body portion 22 and the second lid portion 24. The generator 16 that is accommodated in the generator chamber 12b is located at the intermediate portion of the generator chamber 12b in the axial direction. Accordingly, the inside of the generator chamber 12b is divided into a front portion 12c and a rear portion 12d by the generator 16. The front portion 12c is a space that is located at the front side (the side near the expansion chamber 44 with respect to the generator 16) from the generator 16. The rear portion 12d is a space that is located at the rear side (the side opposite to the expansion chamber 44 with respect to the generator 16) from the generator 16. The front portion 12c communicates with the rear portion 12d through the gap formed between the stator core 40a and the generator rotor 38.

Figure 4:
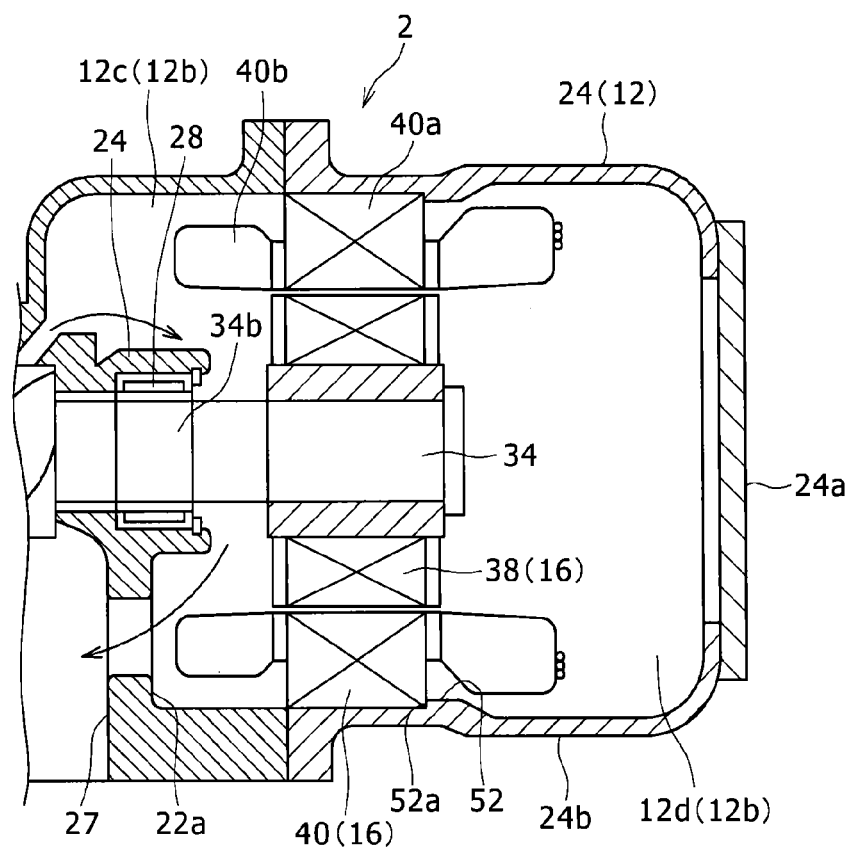
FIG. 4 is a partially enlarged view illustrating a power generation apparatus provided in the power generation system.

As illustrated in FIG. 4, the stator core 40a of the generator 16 is positioned by a step portion 52 formed in the second lid portion 24 of the casing 12, and then is fixed to the second lid portion 24. The step portion 52 is formed in a cylinder portion 24b, which is formed in the peripheral edge of the bottom portion 24a in the second lid portion 24, so as to protrude inward in the radial direction. The step portion 52 is continuously formed in the circumferential direction of the cylinder portion 24b, but may be intermittently formed in the circumferential direction. An end surface 52a near the body portion 22 in the step portion 52 becomes a surface that is substantially perpendicular to the axial direction.

The stator core 40a is pressed into the second lid portion 24, the outer peripheral surface (radial contact portion) of the stator core 40a contacts the inner peripheral surface of the cylinder portion 24b of the second lid portion 24, and one end surface (axial contact portion) of the stator core 40a contacts the end surface 52a near the body portion 22 in the step portion 52. Accordingly, the generator 16 is held at a predetermined position inside the casing 12 by the second lid portion 24.

As illustrated in FIG. 1, the casing 12 is provided with a first communication portion 53 and a second communication portion 54. The first communication portion 53 is formed as a through-hole that penetrates the partition wall portion 22a at the upper position from the expander rotor 32. One end of the first communication portion 53 faces the intermediate portion of the expander rotor 32 in the axial direction at the upper portion of the partition portion 22b. For this reason, the first communication portion 53 communicates with the expansion chamber 44 during the expansion process. The other end of the first communication portion 53 faces the front portion 12c of the generator chamber 12b. Accordingly, the first communication portion 53 causes the expansion chamber 44 to communicate with the front portion 12c of the generator chamber 12b.

The second communication portion 54 is formed as a through-hole that penetrates the partition wall portion 22a at the lower position from the expander rotor 32. One end of the second communication portion 54 faces the discharge chamber 30, and the other end thereof faces the front portion 12c of the generator chamber 12b. Accordingly, the second communication portion 54 causes the front portion 12c of the generator chamber 12b to communicate with the discharge chamber 30.

Here, the running operation of the power generation system according to the embodiment will be described. When the circulation pump 8 is driven, the liquid-phase working medium that is sent from the circulation pump 8 flows into the working medium flow passage 10a of the evaporator 10. The working medium is evaporated while being heated by the heating medium flowing in the heating medium flow passage 10b. The working medium that is evaporated by the evaporator 10 is introduced from the introduction port 26 into the inlet chamber 29 of the power generation apparatus 2. The working medium that flows into the inlet chamber 29 is introduced from the inlet port 49 formed in the partition portion 22b into the expansion chamber 44. When the working medium is introduced into the expansion chamber 44, the expander rotor 32 is rotationally driven, so that the generator rotor 38 of the generator 16 rotates to generate power. At this time, the expansion chamber 44 gradually expands the working medium while moving in the axial direction with the rotation of the expander rotor 32. Accordingly, the pressure of the working medium inside the expansion chamber 44 gradually decreases. Then, the working medium having been used to generate power is discharged from the outlet port 50 into the discharge chamber 30. Since the expansion chamber 44 communicates with the first communication portion 53 during the expansion process, a part of the working medium inside the expansion chamber 44 is introduced into the front portion 12c inside the generator chamber 12b through the first communication portion 53. The working medium flows inside the front portion 12c, and cools the coil 40b of the stator 40 and the generator rotor 38 at this time. Then, the working medium inside the front portion 12c is joined to the working medium inside the discharge chamber 30 through the second communication portion 54. That is, since the pressure inside the expansion chamber 44 during the expansion process is higher than the pressure inside the discharge chamber 30, the working medium is circulated inside the generator chamber 12b due to a pressure difference therebetween. At this time, since the second lid portion 24 constituting the rear portion 12d is blocked in the generator chamber 12b, the working medium inside the front portion 12c scarcely flows into the rear portion 12d.

The working medium inside the discharge chamber 30 is discharged to the circulation flow passage 4 through the discharge port 27. The gas-phase working medium that is discharged from the power generation apparatus 2 is introduced into the working medium flow passage 6a of the condenser 6. In the condenser 6, the working medium is condensed while being cooled by the cooling medium flowing in the cooling medium flow passage 6b. The liquid-phase working medium flows in the circulation flow passage 4 so as to be suctioned into the circulation pump 8. In the circulation flow passage 4, such a circulation is repeated, and hence power is generated in the power generation apparatus 2.

As described above, in the embodiment, the expansion chamber 44 and the generator chamber 12b communicate with each other by the first communication portion 53. Meanwhile, the generator chamber 12b communicates with the downstream portion from the expansion chamber 44 by the second communication portion 54. Since the pressure of the downstream portion from the expansion chamber 44 is lower than the pressure inside the expansion chamber 44 during the expansion process, the working medium inside the expansion chamber 44 flows to the generator chamber 12b through the first communication portion 53 due to a pressure difference therebetween, and then the working medium flows to the downstream portion from the expansion chamber 44 through the second communication portion 54. For this reason, the generator 16 may be cooled by the working medium inside the generator chamber 12b. Accordingly, it is possible to simply cool the generator by the working medium without newly providing a cooling pipe. Further, since the second communication portion 54 causes a portion which is located near the expansion chamber 44 with respect to the generator 16 and is located at the downstream side from the expansion chamber 44 to communicate with the front generator portion 12c, the working medium flows inside the generator chamber 12b without flowing inside the generator 16 (or while slightly flowing inside the generator 16). For this reason, the working medium circulation resistance inside the generator chamber 12b does not increase. Accordingly, the working medium may be effectively caused to flow by the pressure difference, and the power generation efficiency may be prevented from being degraded. Further, since the working medium does not flow inside the generator 16 or slightly flows inside the generator 16, there is a low possibility that foreign matter intrudes into the generator 16 even when the foreign matter is contained in the working medium.

Further, in the embodiment, since the coil 40b of the stator 40 faces the flow passage in which the working medium flows inside the front portion 12c of the generator chamber 12b, the coil 40b that easily emits heat may be effectively cooled.

Further, in the embodiment, since the stator core 40a is coupled to the casing 12, the heat of the stator core 40a is directly transmitted to the casing 12, but this heat may be emitted through the casing 12. Further, since the casing 12 is provided with the step portion 52, the stator 40 may be easily positioned in the axial direction. In addition, when the position of the step portion 52 in the axial direction is adjusted, the width of the flow passage may be easily designed. Accordingly, since the flow rate of the working medium flowing inside the front portion 12c is adjusted, the generator 16 may be efficiently cooled, and the amount of the working medium that drives the expander 14 may be prevented from being excessively decreased.

Further, in the embodiment, since the second communication portion 54 is connected to the discharge chamber 30, the complex configuration inside the casing 12 may be prevented, and hence an advantage in cost may be obtained.

Furthermore, the present invention is not limited to the above-described embodiment, and various modifications and improvements may be made without departing from the spirit of the present invention. The power generation system 1 of the above-described embodiment is configured as the on-vehicle system, but the present invention is not limited thereto. For example, a power generation system may be configured which generates power by recovering the heat of steam or the like using a heating medium that is steam extracted from a well (steam well), steam generated by a solar energy collector using solar heat as a heat source other than steam discharged from a factory or the like, steam or hot water generated from exhaust heat of an engine or a compressor, or steam or hot water generated from a boiler using biomass or fossil fuel as a heat source.

In the above-described embodiment, a configuration has been described in which the second communication portion 54 is connected to the discharge chamber 30, but the present invention is not limited thereto. For example, the second communication portion 54 may not be formed so as to penetrate the partition wall portion 22a, but may be formed so as to penetrate the body portion 22 of the casing 12 and to be connected to the circulation flow passage 4 by a pipe or may be formed so as to penetrate the body portion 22 and to be directly connected to the condenser 6 by the pipe.

Figure 5:
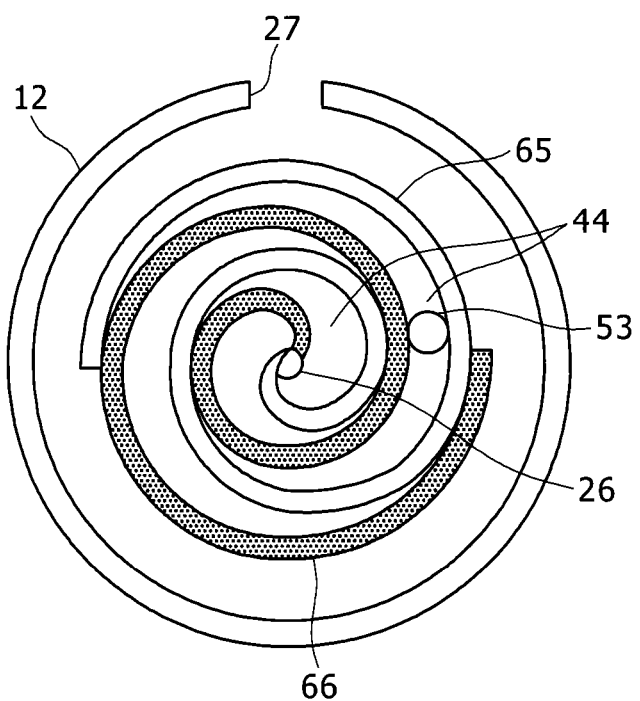
FIG. 5 is a diagram schematically illustrating an expander according to another embodiment of the present invention.

In the above-described embodiment, the expander 14 includes the pair of expander rotors 32 formed as screw rotors having spiral teeth, but the present invention is not limited to this configuration. For example, as illustrated in FIG. 5, the expander 14 may be configured as a scroll-type expander. In this case, the expander 14 includes a fixed scroll 65 that is formed in a scroll shape, a whirl scroll 66 that moves while partially contacting the fixed scroll 65, and the casing 12 that accommodates both scrolls 65 and 66. The introduction port 26 is formed at the center portion of the casing 12 in the radial direction, and the discharge port 27 is formed in the outer peripheral portion of the casing 12. Then, the working medium that is introduced into the expansion chamber 44 between the fixed scroll 65 and the whirl scroll 66 through the introduction port 26 operates the whirl scroll 66. When the whirl scroll 66 rotates, the volume inside the expansion chamber 44 gradually increases, so that the working medium is gradually expanded. Since one end of the first communication portion 53 is opened to the intermediate portion of the casing 12 in the radial direction, a part of the working medium during the expansion process is led to the front portion 12c inside the generator chamber 12b through the first communication portion 53. Even in this configuration, the working medium may be circulated inside the generator chamber 12b by the pressure difference between the pressure of the working medium inside the expansion chamber 44 and the pressure of the working medium inside the discharge chamber 30.

What is claimed is:

1. A power generation apparatus, comprising:
   a generator that includes a rotor and a stator disposed radially outside the rotor;
   an expander through which a working medium flows in a working medium flow direction, while the working medium is expanded in an expansion chamber of the expander to gradually increase the volume of the expansion chamber, the expander having a movable element that is moved by the expansion of the expansion chamber and whose movement drives the rotor; and
   a casing that includes an expander chamber accommodating the expander and a generator chamber accommodating the generator therein,
   a first communication portion that extracts a portion of partially expanded working fluid being expanded in the expansion chamber and discharges the partially expanded working fluid into the front generator portion of the generator chamber, where the front generator portion is located nearer the expansion chamber than is the generator in the generator chamber, and
   a second communication portion that communicates the partially expanded working fluid in front generator portion with a downstream portion located near the expansion chamber with respect to the generator, wherein the downstream portion is a portion downstream from the expansion chamber in the working medium flow direction whereby the working medium has been fully expanded in the downstream portion.

2. The power generation apparatus according to claim 1, wherein a coil of the stator faces a flow passage in which the partially expanded working medium flows inside the front generator portion of the generator chamber.

3. The power generation apparatus according to claim 2, wherein the casing includes a step portion that is located at a rear side of the stator and protrudes inward in the radial direction, and wherein a stator core of the stator includes a radial contact portion that contacts an inner peripheral surface of the casing in the radial direction and an axial contact portion that contacts the step portion in the axial direction.

4. The power generation apparatus according to claim 1, wherein the portion downstream from the expansion chamber is a discharge chamber of the expander.

5. A power generation system comprising:
   an evaporator that evaporates a working medium traveling to the expander of power generation apparatus according to claim 1;
   a condenser that condenses the working medium expanded by the expander of the power generation apparatus; and
   a pump that introduces the working medium condensed by the condenser into the evaporator.

6. The power generation system according to claim 5, wherein the power generation system is an on-vehicle system.

* * * * *